A. J. Surles.
Bee Hive.
Nº 7,991. Patented Mar. 18, 1851.

UNITED STATES PATENT OFFICE.

A. J. SURLES, OF FLORENCE, GEORGIA.

CONSTRUCTION OF BEEHIVES.

Specification of Letters Patent No. 7,991, dated March 18, 1851.

*To all whom it may concern:*

Be it known that I, ALBERT J. SURLES, of Florence, in the county of Stewart and State of Georgia, have invented certain new and useful Improvements in Beehives, which I denominate "The fortified swarming or non-swarming beehive;" and I do hereby declare that the following is a full, clear, and exact description thereof, reference being had to the accompanying drawings, forming part of this specification, in which—

Figure 1:
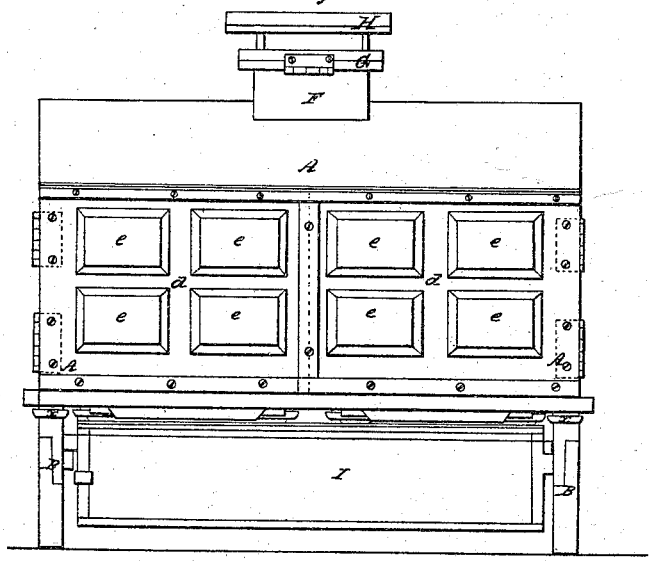
Figure 4:
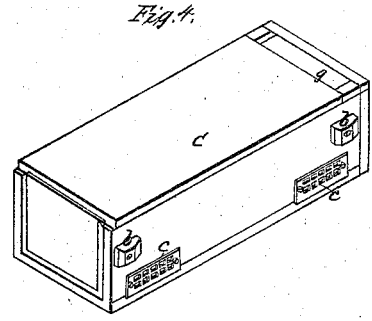
Figure 2:
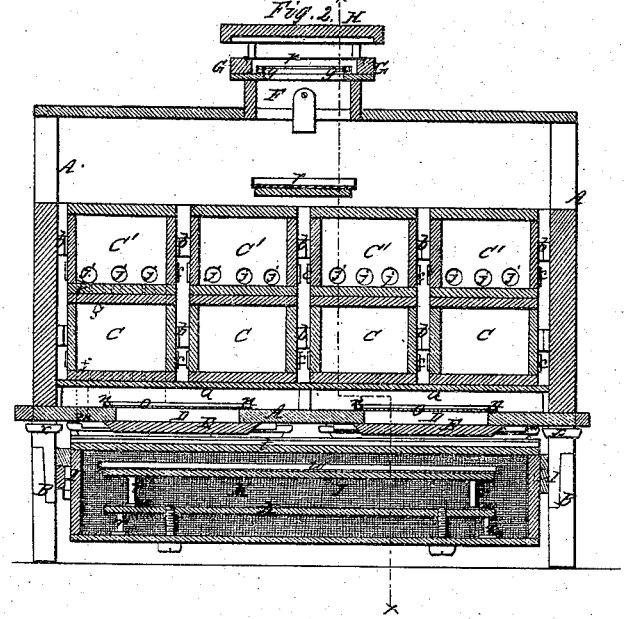
Figure 3:
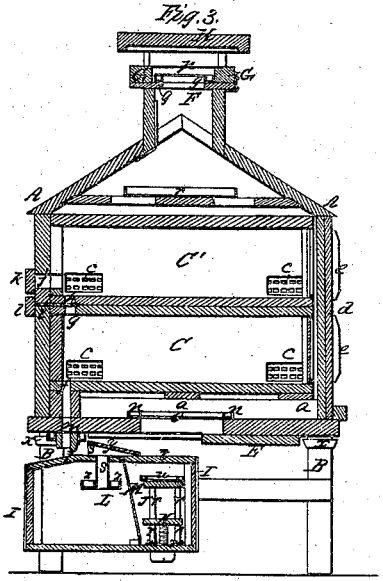

Figure 1, is an elevation. Fig. 2, is a longitudinal section through the center. Fig. 3, is a transverse section through the line $x$—$x$ of Fig. 2. Fig. 4, is a perspective view of one of the drawers.

Similar letters of reference indicate corresponding parts in each of the several figures.

The nature of my invention consists in an improved arrangement of drawers or boxes in which the bees collect, within the hive, by which efficient ventilation is afforded; and in having the opening and closing of the entrances to, and communications between the said drawers or boxes so controlled as to prevent the ingress to or egress from certain compartments, of the bees, whereby they may be induced to swarm or prevented from swarming as may be desired.

It further consists in certain improvements in the construction and arrangement of the insects traps, for more efficiently preventing the entrance of flies, moths, &c.

To enable others skilled in the art to make and use my invention, I will proceed to describe fully its construction and operation.

A, A, A, (Figs. 1, 2, and 3) represent the outer case or body of the hive of quadrangular form, one side (see Fig. 1) consists of two doors $d, d$, opening in the middle so as to throw open the entire side, it is supported upon posts B, B, B, and has its roof slanting so as to protect it from the weather. $a, a$, is a floor consisting of slats placed at a short distance from the bottom of the hive.

C, C, and C′, C′, Figs. 1, 2, 3, and 4, are the drawers which I make sufficiently large to contain about thirty (30,) or thirty-five (35), gallons, the lower ones $c, c$, rest upon the floor $a, a$, and the upper ones rest one on each of the lower ones. Each pair is kept at the distance of about two (2) inches from the ends of the hive or the next drawers, by cleats $b, b$; each drawer has openings $c, c$, on each side near the bottom, covered by ventilators of perforated sheet metal, or of wire gauze having meshes just large enough to prevent the escape of a bee; the ends of the drawer opposite the doors $d, d$, are glazed or provided with glass windows, and the doors $d, d$, are provided with shutters $e, e$, which can be removed for the purpose of examining the drawers; each lower drawer C, has an aperture $f$, see Fig. 3, at the bottom, forming the entrance for the bees, and one $g, g$, (see Figs. 3, 4) at the top which communicates with an aperture $h$, in the bottom of the drawer C′, above it, the communication between these apertures may be closed by a plate of metal $i$, (see Fig. 3,) which slides in through a slot in the side of the hive; there is a separate entrance to the upper drawer C′, through apertures $j, j, j$, at one end near the bottom, which are opposite to corresponding apertures in the sides. These apertures may be closed by a strip of wood $k$, secured by screws to the outside of the hive, and having a piece of leather, india rubber or other elastic material beneath it to make the joint close. A similar strip of wood $l$, may be secured in the same manner to cover the slots in which the plates $i$, are inserted; at the bottom of the hive is a series of apertures $m$, opposite to and corresponding in length and width with the apertures $f$, in the bottoms of the drawers C, C. The mouths of these apertures extend a few inches below the bottom of the hive, and the back of the space under the floor $a$, is closed so as not to allow any entrance of the bees into any part of the hive except the drawers.

There are openings D, D, in the bottom or lower floor of the hive for the purpose of admitting air; these may be closed, or their width regulated by sliding shutters E, E; the openings have muslin or very fine wire gauze $o, o$, stretched across them for the purpose of excluding insects. Oil troughs $n, n$, filled with some limpid animal oil are placed all around them for the purpose of catching any of the insects which may chance to enter.

A ventilator F, similar to a chimney is placed in the roof of the hive, its opening being protected by a hinged lid G, provided with wire gauze or muslin diaphragm $p$, to exclude the insects, and a cover H being placed to keep out the weather; an oil trough $q$, surrounds the opening to catch any small insects which might enter; another oil trough $r$, for the same purpose is placed upon a shelf above the drawers.

I, is a trap for decoying and catching and retaining flies, moths, or other insects. It is a box of oblong form hung below the hive, its top $t$, forms the alighting board, and its front stands bevel with the front of the hive; the entrance S, is immediately behind the entrance to the hive, and has a cover $y$, above it. It is just of sufficient width to prevent the entrance of the bees. The box is divided into two compartments J and L, by a diaphragm M, of muslin or fine wire gauze, and the compartment J, has a shelf K, within it upon which is placed some honey comb; above the shelf is an oil trough $u$; the shelf and trough are supported upon legs $r, r$, around the feet of which small oil troughs $w, w$, are placed to catch small insects, such as ants, caterpillars &c.; the compartment into which the entrance heads has an oil trough Z, suspended within below and around the lower part of the entrance; oil troughs $x\ x$ are placed around the posts B, B, B, below the bottom of the hive.

By the manner described of ventilating the hive, a sufficient quantity of air may be supplied to the drawers by the apertures D, D, at the bottom of the hive without having the entrance for the bees any larger than is necessary to allow them to pass after the press of their harvest; the ventilators $c, c$, may be partly closed by wooden or metal slides or other convenient means when necessary; they are all placed near the bottoms of the drawers to prevent the air passing upward through the drawers and injuring the young broods; every joint in and about every part of the hive should be perfectly air tight and no air admitted except through the ventilating apertures D, D, which are well fortified by the oil troughs. The joints around the doors should be covered by strips of wood tightly screwed down and having felt, leather, or india rubber under them; the outside of the hive may be covered all over with canvass and painted so as to exclude insects at every part.

It is a well known fact that bees will never swarm if allowed too much room in a hive. Now by means of the slide $i$, between the top and bottom drawers, I can prevent the entrance of the bees into the top drawers and confine them to the bottom ones, and thereby induce them to swarm; but as long as the entrance to the top drawer is open they will never swarm, for it is proved by observation that they cannot be induced to do so when placed in too large a space, even though a large number are placed therein, for they will dwindle away to a certain number; the space required will vary according to the pasturage where the bees are kept.

The apertures J, J, J, which enter directly from the outside to the upper compartment are only intended to be open during the busy and early part of the season (the months of April, May and June,) and before the enemies of the bees commence their depredations, but as soon as the busy season is over they must be closed, as then the depredations of the moths &c. commence.

The arrangement of the trap I, is such, as, to induce the flies, moths, &c., to enter it in preference to the entrances $m, m$, of the hive, as they will be attracted by the perfume arising from the comb placed in the compartment J, as soon as they enter into the compartment L, they are unable to ascend and return being prevented by the trough $n$, so they remain and die for want of sustenance, being prevented by the wire gage diaphragm M, from reaching the honey comb; they deposit their eggs, which are hatched. The young also die, for if they pass the diaphragm M, and attempt to reach the comb on the shelf K, they by crawling up the legs $v, v$ get into oil troughs $w$. The comb placed in the trap will last a whole season and then serve to make wax.

Care should be taken in suspending the trap that the alighting board $t$, is not placed within about three eighths ($\frac{3}{8}$) of an inch from the bottom of the openings $m, m$, as ants or other crawling insects might crawl from it to the hive. Slides are placed in the openings $m, m$, by which they can be contracted in length or closed altogether.

What I claim as my invention and desire to secure by Letters Patent, is—

Having the comb placed within the trap I, fortified or protected from the moth or other insects by the diaphragm M, substantially in the manner herein fully explained.

A. J. SURLES.

Witnesses:
WILLIAM SEAY,
D. W. SURLES.